US008810075B2

(12) United States Patent
Chiu

(10) Patent No.: US 8,810,075 B2
(45) Date of Patent: Aug. 19, 2014

(54) POWER OFF DELAY CIRCUIT AND POWER SUPPLY SYSTEM

(75) Inventor: Yi-Guo Chiu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 557 days.

(21) Appl. No.: 13/186,460

(22) Filed: Jul. 19, 2011

(65) Prior Publication Data

US 2012/0326513 A1 Dec. 27, 2012

(30) Foreign Application Priority Data

Jun. 23, 2011 (TW) ................................ 100121919

(51) Int. Cl.
*H02J 9/06* (2006.01)

(52) U.S. Cl.
CPC ........................................ *H02J 9/06* (2013.01)
USPC ........................................................ 307/125

(58) Field of Classification Search
CPC ........................................................ H02J 9/06
USPC ................................ 307/125; 363/20, 21.02
See application file for complete search history.

(56) References Cited

FOREIGN PATENT DOCUMENTS

CN 2819297 9/2006

*Primary Examiner* — Jared Fureman
*Assistant Examiner* — Joel Barnett
(74) *Attorney, Agent, or Firm* — Novak Druce Connolly Bove + Quigg LLP

(57) ABSTRACT

A power off delay circuit includes a first diode with an anode receiving input power and a boost transformer circuit connected to a cathode of the first diode. The boost transformer circuit outputs power signals to a load circuit, and includes a capacitor, a primary winding, a first secondary winding, and a second secondary winding. The capacitor is charged when an input power is on, and discharges when the input power is off. The first secondary winding boosts power flowing through the primary winding and the first switch branch to charge the capacitor via the third switch branch when the input power is on. The capacitor discharges via the second secondary winding and the fourth switch branch when the input power is off, and the primary winding boosts discharging power of the capacitor, and outputs boosted discharging power to the load circuit via the second switch branch.

18 Claims, 6 Drawing Sheets

POWER OFF DELAY CIRCUIT AND POWER SUPPLY SYSTEM

BACKGROUND

1. Technical Field

The disclosure relates to power supply systems, and particularly to a power off delay circuit.

2. Description of Related Art

Electronic devices usually use capacitors charging to provide necessary power to load circuits, such as, central processing units, when power supplies of the electronic devices are off. Because the power need by the load circuits increases with advancing function and process speed, capacitance of the capacitors need to be increased to provide enough power when the power supplies are off. However, the capacitors with large capacitance may not provide enough power off delay time.

BRIEF DESCRIPTION OF THE DRAWINGS

FIG. 5 is a signal flow diagram of a power off delay circuit when input power is on.

DETAILED DESCRIPTION

Figure 1:
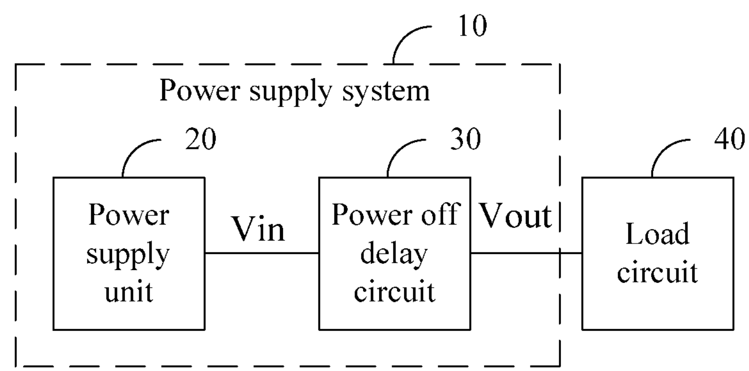
FIG. 1 is a schematic diagram of one embodiment of a power supply system as disclosed.

FIG. 1 is a schematic diagram of one embodiment of a power supply system 10 as disclosed. In one embodiment, the power supply system 10 may be located in a network communication device, such as a server, and outputs power signals Vout to a load circuit 40 of the network communication device. In one embodiment, the load circuit 40 may be working circuits of the network communication device, such as, a central processing unit. In alternative embodiments, the load circuit 40 may further include a direct current (DC)/DC converter to convert the power signals Vout to provide to other working circuits of the network communication device. The power supply system 10 includes a power supply unit 20 and a power off delay circuit 30. The power supply unit 20 converts voltage from an external power supply into suitable input power Vin to input to the power off delay circuit 30. The power off delay circuit 30 receives the input power Vin, outputs the power signals Vout to the load circuit 40, and continuously output the power signals Vout to the load circuit 40 to do necessary process, such as, generating dying gasp signals, in a power off delay time when the input power Vin is off. In one embodiment, the input power Vin a DC power, and the power off delay time can be set according to actual need, such as, 5 seconds.

Figure 2:
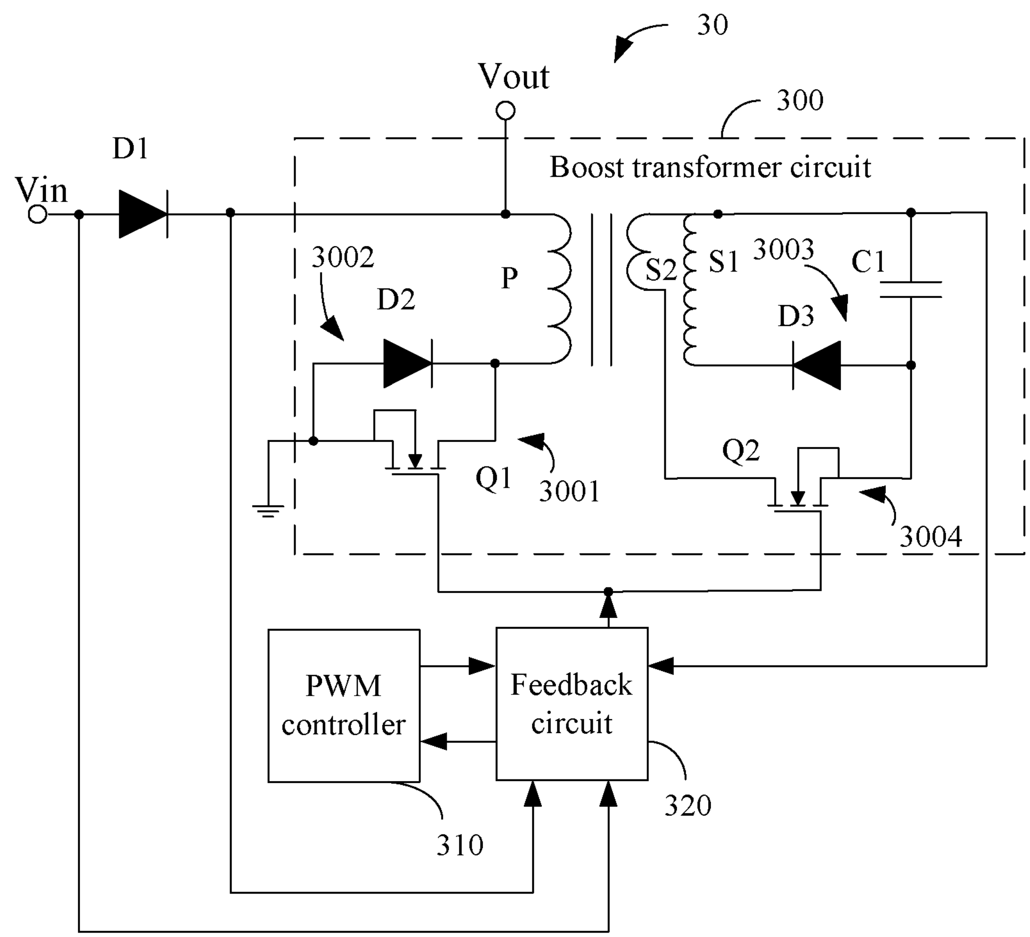
FIG. 2 is a schematic diagram of one embodiment of a power off delay circuit as disclosed.

FIG. 2 is a schematic diagram of one embodiment of the power off delay circuit 30 as disclosed. In one embodiment, the power off delay circuit 30 includes a first diode D1 and a boost transformer circuit 300. An anode of the first diode D1 receives the input power Vin, and a cathode of the first diode D1 is connected to the boost transformer circuit 300. The boost transformer circuit 300 outputs the power signals Vout to the load circuit 40, and includes a capacitor C1, a primary winding P, a first secondary winding S1, a second secondary winding S2, and a first to fourth switch branches 3001, 3002, 3003, 3004. The capacitor C1 is charged when the input power Vin in on, and discharges when the input power Vin is off. A positive input of the primary winding P is connected to the cathode of the first diode D1, and outputs the power signals Vout to the load circuit 40. A negative input of the primary winding P is grounded via the first switch branch 3001 and the second switch branch 3002, which two are connected in parallel. In one embodiment, when the input power Vin is on, the input power Vin flows through the first diode D1, and then acts as the power signals Vout flowing to the load circuit 40 and flows through the primary winding P the first switch branch 3001 to the ground. When the input power Vin is off, the first switch branch 3001 is turned off, and the second switch branch 3002 is turned on. In one embodiment, the primary winding P, the first secondary winding S1, and the second secondary winding S2 are wound on a same magnetic core.

A high voltage terminal of the first secondary winding S1 is connected to one end of the capacitor C1, and a low voltage terminal of the first secondary winding S1 is connected to the other end of the capacitor C1 via the third switch branch 3003. A number of turns of the first secondary winding S1 is greater than a number of turns of the primary winding P. In one embodiment, the number of turns of the first secondary winding S1 is double of the number of turns of the primary winding P. Thus, when the input power Vin is on, the first secondary winding S1 boosts power flowing through the primary winding P and the first switch branch 3001 to charge the capacitor C1 via the third switch branch 3003.

A high voltage terminal of the second secondary winding S2 is connected to the high voltage terminal of the first secondary winding S1, and a low voltage terminal of the second secondary winding S2 is connected to the other end of the capacitor C1 via the fourth switch branch 3004. A number of turns of the second secondary winding S2 is less than the number of turns of the primary winding P. Thus, when the input power Vin is off, the capacitor C1 discharges via the second secondary winding S2 and the fourth switch branch 3004, and the primary winding P boosts discharging power of the capacitor C1, and outputs boosted discharging power to the load circuit 40 via the second switch branch 3002.

In one embodiment, when the input power Vin is on, the input power Vin flows through the first diode D1, the primary winding P, and the first switch branch 3001 to the ground, the positive input of the primary winding P outputs the power signals Vout to the load circuit 40. At this time, the first secondary winding S1 senses current flowing through the primary winding P, and boosts the power flowing through the primary winding P to charge the capacitor C1 via the third switch branch 3003. A loop of the second secondary winding S2 and the fourth switch branch 3004 is off.

When the input power Vin is off, the capacitor C1 discharges via the second secondary winding S2 and the fourth switch branch 3004, and a loop of the first secondary winding S1 and the third switch branch 3003 is off. At this time, the first switch branch 3001 is also off, and the primary winding P senses current flowing through the second secondary winding S2, and boosts the discharging power flowing through the second secondary winding S2 to generate the power signals Vout. The power signals Vout flows through the second switch branch 3002, the negative input of the primary winding P, and the positive input of the primary winding P to the load circuit 40 in turn. The first diode D1 prevents the power signals Vout generated by the primary winding P from flowing back to the input power Vin.

The boost transformer circuit 300 uses the first secondary winding S1 to boost power when the input power Vin is on, and uses the primary winding P to boost when the input power Vin is off. Thus, capacitance of the capacitor C1 can be reduced. In addition, the boost transformer circuit 300 increases voltage provided by the power off delay circuit 30, which extends the power off delay time and advances utilization ratio of energy of the capacitor C1.

The power off delay circuit 30 further includes a pulse width modulation (PWM) controller 310 and a feedback circuit 320. The feedback circuit 320 is connected to the positive input of the primary winding P and the high voltage terminal of the first secondary winding S1, and detects whether the input power Vin is off, and generates and sends first feedback signals to the PWM controller 310. The PWM controller 310 generates PWM signals according to the first feedback signals. The feedback circuit 320 sends the PWM signals to the first switch branch 3001 or the fourth switch branch 3004 according to whether the input power Vin is off. When the input power Vin is on, the feedback circuit 320 sends the PWM signals to the first switch branch 3001. When the input power Vin is off, the feedback circuit 320 sends the PWM signals to the fourth switch branch 3004. In one embodiment, the PWM controller 310 generates the PWM signals corresponding to the first feedback signals to control an on duty of the first switch branch 3001 or the fourth switch branch 3004 to regulate voltage of the power signals Vout. Thus, a voltage range of the power signals provided by the power off delay circuit 30 is increased.

In one embodiment, the first switch branch 3001 includes a first switch Q1 including a first pole, a second pole, and a control pole. The control pole of the first switch Q1 receives the PWM signals from the feedback circuit 320 when the input power Vin is on, the first pole is connected to the negative input of the primary winding P, and the second pole is grounded. The second switch branch 3002 includes a second diode D2 with a cathode connected to the negative input of the primary winding P and an anode grounded. The third switch branch 3003 includes a third diode D3 with an anode connected to the other end of the capacitor C1 and a cathode connected to the low voltage terminal of the first secondary winding S1. The fourth switch branch 3004 includes a second switch Q2 including a first pole, a second pole, and a control pole. The control pole of the second switch Q2 receives the PWM signals from the feedback circuit 320 when the input power Vin is off, the first pole of the second switch Q2 is connected to the low voltage terminal of the second secondary winding S2, and the second pole of the second switch Q2 is connected to the other end of the capacitor C1.

In one embodiment, the first switch Q1 and the second switch Q2 are both N-type metal oxide semiconductor field effect transistors (NMOSFET). The control poles of the first switch Q1 and the second switch Q2 are both gates of the NMOSFETS, the first poles of the first switch Q1 and the second switch Q2 are both drains of the NMOSFETS, and the second poles of the first switch Q1 and the second switch Q2 are both sources of the NMOSFETS.

In one embodiment, when the input power Vin is on, the feedback circuit 320 sends the PWM signals to the first switch branch 3001, that is, to the control pole of the first switch Q1. When the input power Vin is off, the feedback circuit 320 sends the PWM signals to the fourth switch branch 3004, that is, to the control pole of the second switch Q2.

Figure 3:
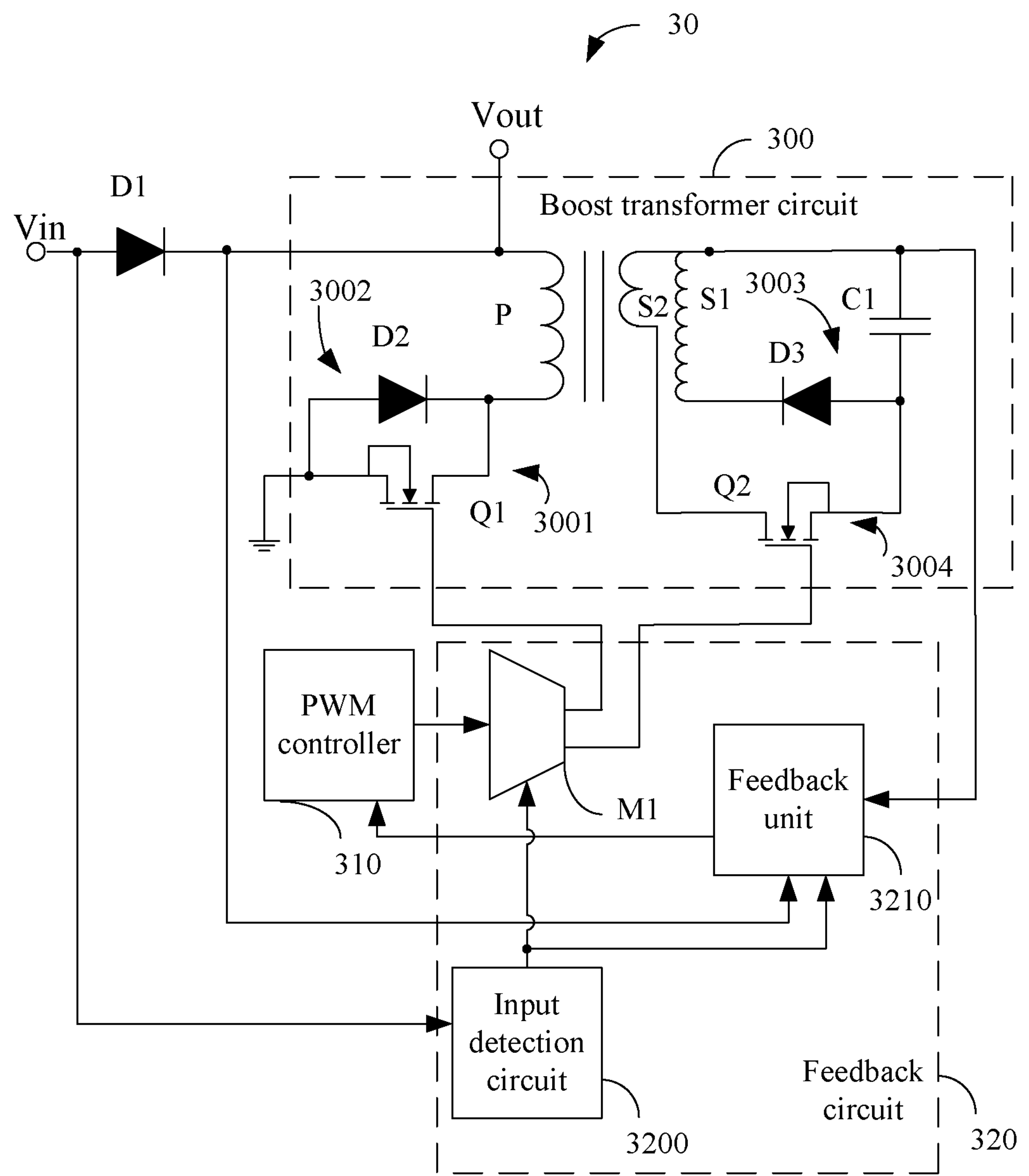
FIG. 3 is a schematic diagram of one embodiment of a feedback circuit of a power off delay circuit as disclosed.

FIG. 3 is a schematic diagram of one embodiment of the feedback circuit 320 of the power off delay circuit 30 as disclosed. The feedback circuit 320 includes an input detection circuit 3200, a feedback unit 3210, and a first multiplexer M1. The feedback unit 3210 is connected to the positive input of the primary winding P and the high voltage terminal of the first secondary winding S1, and generates and sends the first feedback signals to the PWM controller 310. The input detection circuit 3200 detects whether the input power Vin is off, and generates control signals. In one embodiment, the input detection circuit 3200 includes a comparator comparing the input power Vin with a reference voltage to output the control signals. In one embodiment, when the input power Vin is on, the input detection circuit 3200 outputs the control signals with high logic level, when the input power Vin is off, the input detection circuit 3200 outputs the control signals with low logic level. In alternative embodiments, when the input power Vin is on, the input detection circuit 3200 outputs the control signals with low logic level, when the input power Vin is off, the input detection circuit 3200 outputs the control signals with high logic level.

The first multiplexer M1 receives the PWM signals from the PWM controller 310, and sends the PWM signals to the control pole of the first switch Q1 or to the control pole of the second switch Q2 under control of the control signals from the input detection circuit 3200. In one embodiment, when the input power Vin is off, the input detection circuit 3200 outputs the control signals to control the first multiplexer M1 to switch to a branch connected to the second switch Q2. When the input power Vin is on, the input detection circuit 3200 outputs the control signals to control the first multiplexer M1 to switch to a branch connected to the first switch Q1. Thus, when the input power Vin is on, the PWM signals are only input to the control pole of the first switch Q1, and when the input power Vin is off, the PWM signals are only input to the control pole of the second switch Q2.

Figure 4:
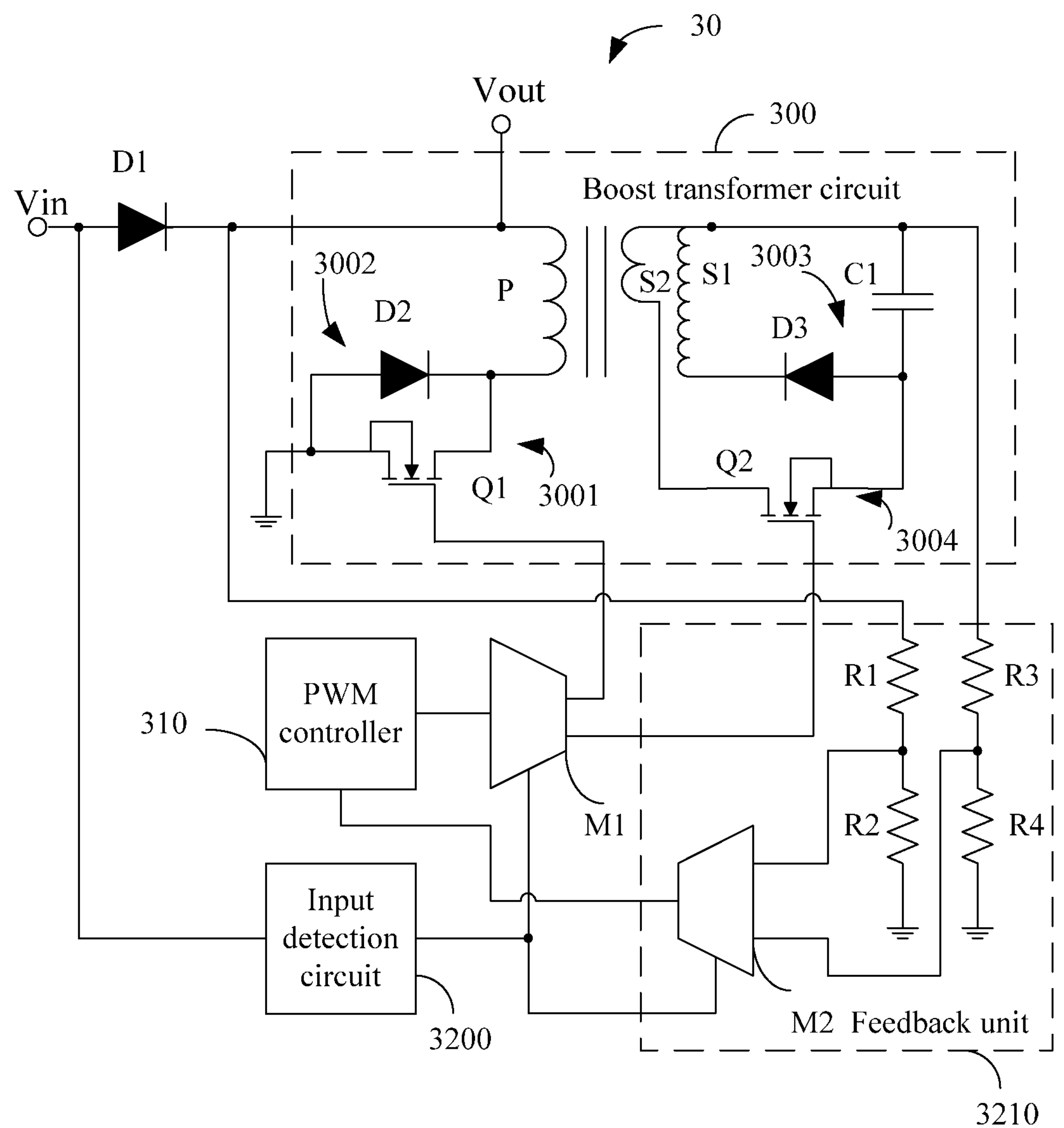
FIG. 4 is a circuit diagram of one embodiment of a power off delay circuit as disclosed.

FIG. 4 is a circuit diagram of one embodiment of the power off delay circuit 30 as disclosed, especially a circuit diagram of the feedback unit 3210. The feedback unit 3210 includes a first to fourth resistors R1 to R4 and a second multiplexer M2. The first resistor R1 and the second resistor R2 is connected between the positive input of the primary winding P and the ground in series, and second feedback signals are generated from a junction of the first resistor R1 and the second resistor R2. The third resistor R3 and the fourth resistor R4 are connected between the high voltage terminal of the first secondary winding S1 and the ground in series, and third feedback signals are generated from a junction of the third resistor R3 and the fourth resistor R4. The second multiplexer M2 selects the second feedback signals or the third feedback signals to be the first feedback signals to send to the PWM controller 310 under control of the control signals from the input detection circuit 3200.

In one embodiment, the input power Vin is on, the input detection circuit 3200 controls the second multiplexer M2 to switch to a branch connected to the junction of the first resistor R1 and the second resistor R2. That is, the second multiplexer M2 selects the second feedback signals to be the first feedback signals to send to the PWM controller 310. The PWM controller 310 generates the PWM signals according to the first feedback signals, and sends the PWM signals to the first multiplexer M1. The first multiplexer M1 sends the PWM signals to the control pole of the first switch Q1 to control the on duty of the first switch Q1 to regulate the voltage of the power signals Vout.

When the input power Vin is off, the input detection circuit 3200 controls the second multiplexer M2 to switch to a branch connected to the junction of the third resistor R3 and the fourth resistor R4. That is, the second multiplexer M2 selects the third feedback signals to be the first feedback signals to send to the PWM controller 310. The PWM controller 310 generates the PWM signals according to the first feedback signals, and sends the PWM signals to the first multiplexer M1. The first multiplexer M1 sends the PWM signals to the control pole of the second switch Q2 to control the on duty of the second switch Q2 to regulate voltage of the discharging power, which regulates the voltage of the power signals Vout.

Figure 5:
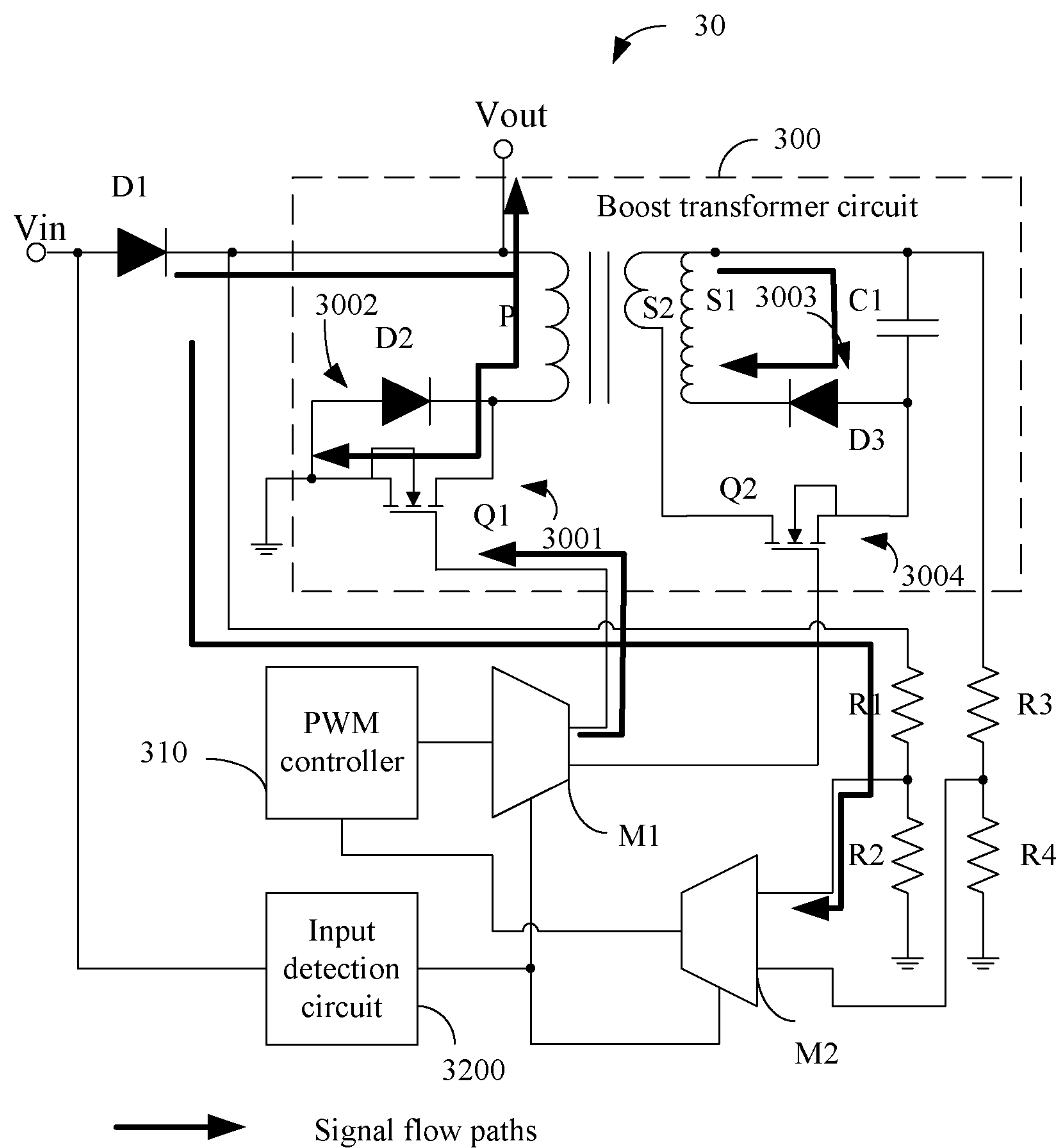

FIG. 5 is a signal flow diagram of one embodiment of the power off delay circuit 30 when the input power Vin is on, which shows signal flow paths when the input power Vin is on. When the input power Vin is on, the first resistor R1 and the second resistor R2 retrieve the second feedback signals from the cathode of the first diode D1, and the second multiplexer M2 selects the second feedback signals to be the first feedback signals to send to the PWM controller 310. The PWM controller 310 generates the PWM signals according to the first feedback signals, and sends the PWM signals to the control pole of the first switch Q1 via the first multiplexer M1 to make the first switch Q1 to work. Thus, the input power Vin flows to the load circuit 40 through the first diode D1, and flows to the ground through the first diode D1, the primary winding P, and the first switch Q1. At this time, the first secondary winding S1 generates inductive current from the primary winding P to charge the first capacitor C1.

Figure 6:
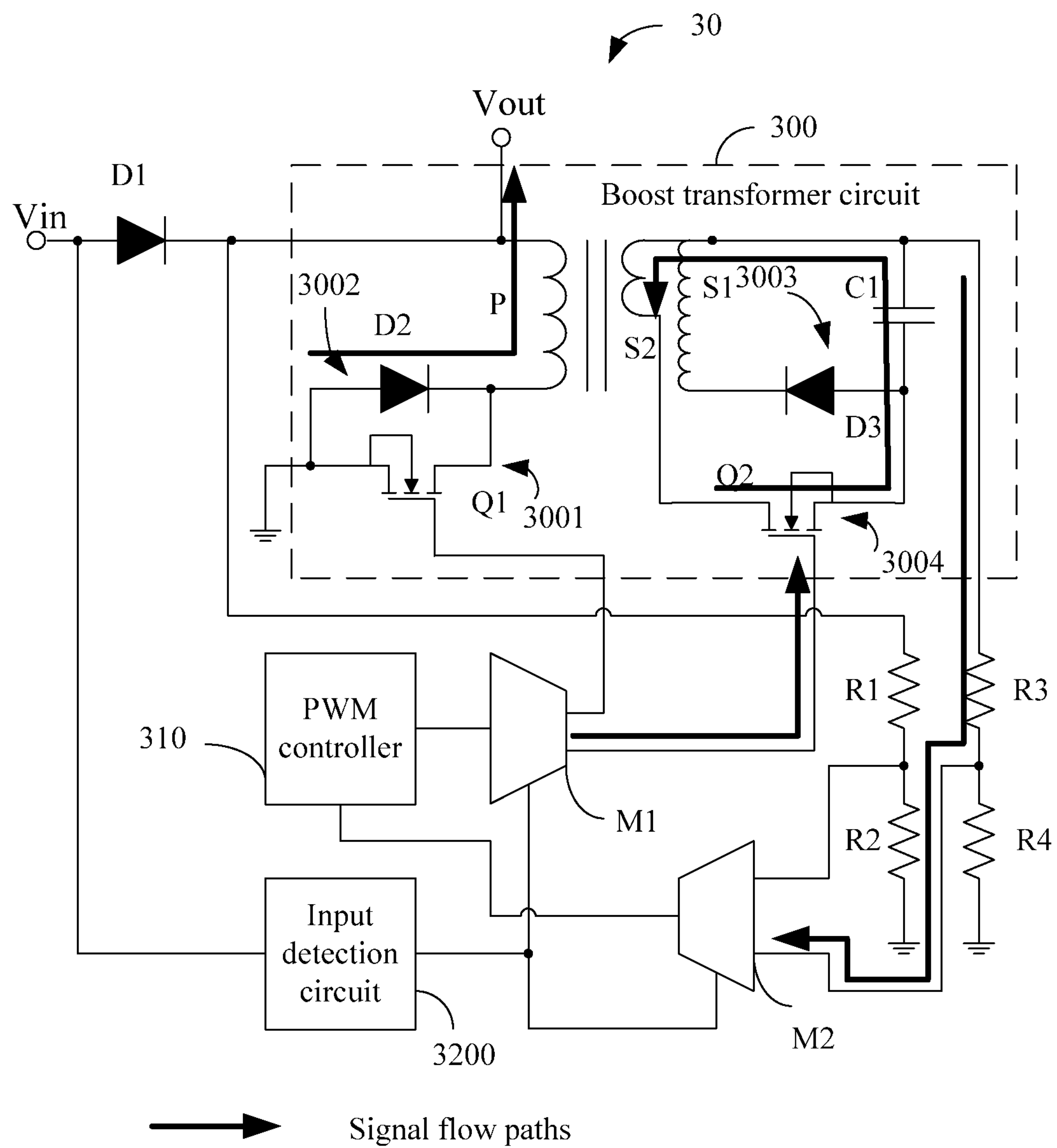
FIG. 6 is a signal flow diagram of a power off delay circuit when input power is off.

FIG. 6 is a signal flow diagram of one embodiment of the power off delay circuit 30 when the input power Vin is off, which shows signal flow paths when the input power Vin is off. When the input power Vin is off, the third resistor R3 and the fourth resistor R4 retrieve the third feedback signals from the high voltage terminal of the second secondary winding S2, and the second multiplexer M2 selects the third feedback signals to be the first feedback signals to send to the PWM controller 310. The PWM controller 310 generates the PWM signals according to the first feedback signals, and sends the PWM signals to the control pole of the second switch Q2 to make the second switch Q2 to work. Thus, the capacitor C1 discharges via the second secondary winding S2 and the second switch Q2. The primary winding P generates inductive current from the second secondary winding S2, which flows from the anode of the second diode D2 to the load circuit 40 through the cathode of the second diode D2 and the primary winding P. In one embodiment, the current flowing through the primary winding P when the input power Vin is on and the current flowing through the primary winding when the input power Vin is off are of opposite directions.

The boost transformer circuit 300 uses the first secondary winding S1 to boost power when the input power Vin is on, and uses the primary winding P to boost power when the input power Vin is off. Thus, capacitance of the capacitor C1 can be reduced. In addition, the boost transformer circuit 300 increases voltage provided by the power off delay circuit 30, which extends the power off delay time and advances utilization ratio of energy of the capacitor C1.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A power off delay circuit, connected between a power supply unit and a load circuit, the power off delay circuit comprising:

a first diode having an anode and a cathode, the anode of the first diode connected to the power supply unit;

a boost transformer circuit, connected to the cathode of the first diode, to output power signals to the load circuit, the boost transformer circuit comprising:

a primary winding having a positive input and a negative input, the positive input of the primary winding connected to the cathode of the first diode and outputting the power signals to the load circuit;

a second diode, a cathode of the second diode connected to the negative input of the primary winding, and an anode grounded;

a first switch, comprising a first pole connected to the negative input of the primary winding, a second pole grounded, and a control pole;

a first secondary winding, wound on a same magnetic core with the primary winding, and having a high voltage terminal and a low voltage terminal, wherein a number of turns of the first secondary winding is greater than a number of turns of the primary winding;

a second secondary winding, wound on the same magnetic core with the primary winding, and having a high voltage terminal and a low voltage terminal, wherein a number of turns of the second secondary winding is less than the number of turns of the primary winding, and the high voltage terminal of the second secondary winding is connected to the high voltage terminal of the first secondary winding;

a capacitor, one end of the capacitor connected to the high voltage terminal of the first secondary winding;

a third diode, an anode of the third diode connected to the other end of the capacitor, and a cathode of the third diode connected to the low voltage terminal of the first secondary winding; and a second switch, comprising a first pole connected to the low voltage terminal of the second secondary winding, a second pole connected to the other end of the capacitor, and a control pole;

a feedback circuit, connected to the positive input of the primary winding and the high voltage terminal of the first secondary winding, to generate first feedback signals based on whether input power provided by the power supply unit is off; and a pulse width modulation (PWM) controller, to generate PWM signals according to the first feedback signals;

wherein the feedback circuit further sends the PWM signals to the control pole of the first switch or the control pole of the second switch according to whether the input power is off.

2. The power off delay circuit of claim 1, wherein the feedback circuit sends the PWM signals to the control pole of the first switch upon the condition that the input power is on, and sends the PWM signals to the control pole of the second switch upon the condition that input power is off.

3. The power off delay circuit of claim 1, wherein the feedback circuit comprises:

a feedback unit, connected to the positive input of the primary winding and the high voltage terminal of the first secondary winding, to generate and send the first feedback signals to the PWM controller;

an input detection circuit, configured and structured to detect whether the input power is off and to generate control signals; and a first multiplexer, to receive the PWM signals and to send the PWM signals to the control pole of the first switch or the control pole of the second switch under control of the control signals from the input detection circuit.

4. The power off delay circuit of claim 3, wherein the feedback unit comprises:

a first resistor;

a second resistor, the first resistor and the second resistor connected between the positive input of the primary winding and the ground in series, wherein second feedback signals are generated from a junction of the first resistor and the second resistor;

a third resistor;

a fourth resistor, the third resistor and the fourth resistor connected between the high voltage terminal of the first secondary winding and the ground in series, wherein third feedback signals are generated from a junction of the third resistor and the fourth resistor; and a second multiplexer, to select the second feedback signals or the third feedback signals to be the first feedback signals to send to the PWM controller under control the control signals.

5. The power off delay circuit of claim 4, wherein the second multiplexer selects the second feedback signals to be the first feedback signals when the input power is on, and selects the third feedback signals to be the first feedback signals when the input power is off.

6. The power off delay circuit of claim 1, wherein the first switch and the second switch are both N-type metal oxide semiconductor field effect transistor (NMOSFET), the control poles of the first switch and the second switch are both gates of the NMOSFET, the first poles of the first switch and the second switch are both drains of the NMOSFET, and the second poles of the first switch and the second switch are both sources of the NMOSFET.

7. A power supply system, providing power signals to load circuit, the power supply system comprising:

a power supply unit, to convert external power supply into suitable input power; and a power off delay circuit, connected between the power supply unit and the load circuit, to provide the power signals to the load circuit, the power off delay circuit comprising:

a first diode having an anode and a cathode, the anode of the first diode connected to the power supply unit;

a boost transformer circuit, connected to a cathode of the first diode, to output power signals to the load circuit, the boost transformer circuit comprising:

a primary winding having a positive input and a negative input, the positive input of the primary winding connected to the cathode of the first diode and outputting the power signals to the load circuit;

a second diode, a cathode of the second diode connected to the negative input of the primary winding, and an anode grounded;

a first switch, comprising a first pole connected to the negative input of the primary winding, a second pole grounded, and a control pole;

a first secondary winding, wound on the same magnetic core with the primary winding, and having a high voltage terminal and a low voltage terminal, wherein a number of turns of the first secondary winding is greater than a number of turns of the primary winding;

a second secondary winding, wound on the same magnetic core with the primary winding, and having a high voltage terminal and a low voltage terminal, wherein a number of turns of the second secondary winding is less than the number of turns of the primary winding, and the high voltage terminal of the second secondary winding is connected to the high voltage terminal of the first secondary winding;

a capacitor, one end of the capacitor connected to the high voltage terminal of the first secondary winding;

a third diode, an anode of the third diode connected to the other end of the capacitor, and a cathode of the third diode connected to the low voltage terminal of the first secondary winding; and a second switch, comprising a first pole connected to the low voltage terminal of the second secondary winding, a second pole connected to the other end of the capacitor, and a control pole;

a feedback circuit, connected to the positive input of the primary winding and the high voltage terminal of the first secondary winding, to generate first feedback signals based on whether input power provided by the power supply unit is off; and a pulse width modulation (PWM) controller, to generate PWM signals according to the first feedback signals;

wherein the feedback circuit further sends the PWM signals to the control pole of the first switch or the control pole of the second switch according to whether the input power is off.

8. The power supply system of claim 7, wherein the feedback circuit sends the PWM signals to the control pole of the first switch upon the condition that the input power is on, and sends the PWM signals to the control pole of the second switch upon the condition that input power is off.

9. The power supply system of claim 7, wherein the feedback circuit comprises:

a feedback unit, connected to the positive input of the primary winding and the high voltage terminal of the first secondary winding, to generate and send the first feedback signals to the PWM controller;

an input detection circuit, configured and structured to detect whether the input power is off and to generate control signals; and a first multiplexer, to receive the PWM signals and to send the PWM signals to the control pole of the first switch or the control pole of the second switch under control of the control signals from the input detection circuit.

10. The power supply system of claim 9, wherein the feedback unit comprises:

a first resistor;

a second resistor, the first resistor and the second resistor connected between the positive input of the primary winding and the ground in series, wherein second feedback signals are generated from a junction of the first resistor and the second resistor;

a third resistor;

a fourth resistor, the third resistor and the fourth resistor connected between the high voltage terminal of the first secondary winding and the ground in series, wherein third feedback signals are generated from a junction of the third resistor and the fourth resistor; and a second multiplexer, to select the second feedback signals or the third feedback signals to be the first feedback signals to send to the PWM controller under control the control signals.

11. The power supply system of claim 10, wherein the second multiplexer selects the second feedback signals to be the first feedback signals when the input power is on, and selects the third feedback signals to be the first feedback signals when the input power is off.

12. The power supply system of claim 10, wherein the first switch and the second switch are both N-type metal oxide semiconductor field effect transistor (NMOSFET), the control poles of the first switch and the second switch are both gates of the NMOSFET, the first poles of the first switch and the second switch are both drains of the NMOSFET, and the second poles of the first switch and the second switch are both sources of the NMOSFET.

13. A power off delay circuit, comprising:

a first diode having an anode and a cathode an anode of the first diode receiving input power;

a boost transformer circuit, connected to the cathode of the first diode, to output power signals to a load circuit, the boost transformer circuit comprising:

a capacitor structured to be charged when an input power is on, and to discharge when the input power is off;

a primary winding, a positive input of the primary winding connected to the cathode of the first diode and outputting the power signals to the load circuit, and a negative input of the primary winding grounded via a first switch branch and a second switch branch connected in parallel;

a first secondary winding, a high voltage terminal of the first secondary winding connected to one end of the capacitor, a low voltage terminal of the first secondary winding connected to the other end of the capacitor via a third switch branch, wherein a number of turns of the first secondary winding is greater than a number of turns of the primary winding, and the first secondary winding boosts power flowing through the primary winding and the first switch branch to charge the capacitor via the third switch branch when the input power is on; and a second secondary winding, a high voltage terminal of the second secondary winding connected to the high voltage terminal of the first secondary winding, a low voltage terminal of the second secondary winding connected to the other end of the capacitor via a fourth switch branch, wherein a number of turns of the second secondary winding is less than the number of turns of the primary winding, and the capacitor discharges via the second secondary winding and the fourth switch branch when the input power is off;

wherein the primary winding further boosts discharging power of the capacitor, and outputs boosted discharging power to the load circuit via the second switch branch.

14. The power off delay circuit of claim 13, further comprising:

a feedback circuit, connected to the positive input of the primary winding and the high voltage terminal of the first secondary winding, to detect whether the input power is off and generate first feedback signals; and a pulse width modulation (PWM) controller, to generate PWM signals according to the first feedback signals; and wherein the feedback circuit further sends the PWM signals to the first switch branch or the fourth switch branch according to whether the input power is off.

15. The power off delay circuit of claim 13, wherein the first switch branch comprises a first switch comprising a first pole, a second pole, and a control pole, the control pole receives the PWM signals from the feedback circuit when the input power is on, the first pole is connected to the negative input of the primary winding, and the second pole is grounded.

16. The power off delay circuit of claim 13, wherein the second switch branch comprises a second diode, a cathode of the second diode is connected to the negative input of the primary winding, and an anode of the second diode is grounded.

17. The power off delay circuit of claim 13, wherein the third switch branch comprises a third diode, an anode of the third diode is connected to the other end of the capacitor, and a cathode of the third diode is connected to the low voltage terminal of the first secondary winding.

18. The power off delay circuit of claim 13, wherein the fourth switch branch comprises a second switch comprising a first pole, a second pole, and a control pole, the first pole of the second switch is connected to the low voltage terminal of the second secondary winding, the second pole of the second switch is connected to the other end of the capacitor, and the control pole of the second switch receives the PWM signals from the feedback circuit when the input power is off.

* * * * *